United States Patent [19]

Chambers

[11] Patent Number: 4,488,214
[45] Date of Patent: Dec. 11, 1984

[54] HIGH-POWER, HIGH-FREQUENCY INVERTER SYSTEM WITH COMBINED DIGITAL AND ANALOG CONTROL

[75] Inventor: Derek Chambers, Bayville, N.Y.

[73] Assignee: Spellman High Voltage Electronics Corp., Plainview, N.Y.

[21] Appl. No.: 441,660

[22] Filed: Nov. 15, 1982

[51] Int. Cl.³ .............................................. H02P 13/22
[52] U.S. Cl. ....................................... 363/71; 363/28; 363/96
[58] Field of Search ...................... 363/27, 28, 57, 71, 363/72, 96, 135

[56] References Cited

U.S. PATENT DOCUMENTS 3,823,362  7/1974  Bailey .................................... 363/72

FOREIGN PATENT DOCUMENTS 2221200  4/1972  Fed. Rep. of Germany ........ 363/28
66278  5/1980  Japan ..................................... 363/27

OTHER PUBLICATIONS

Nakaoka et al., "Time-Sharing High-Frequency High--Power Thyristor Switching DC-DC Converters with Energy-Storage and Transfer Reactor Links", Conference, INTELEC 79, Washington, DC., pp. 289-296, (Nov. 26-29, 1979).

*Primary Examiner*—William H. Beha, Jr.
*Attorney, Agent, or Firm*—Gottlieb, Rackman & Reisman

[57] ABSTRACT

An inverter system having a plurality of resonating current supplying stages connected in parallel, all resonant at the same frequency. The rate at which the stages operate is controlled by a feedback circuit responsive to the load output. The rate is maintained above the audible range for all but small total current values. Should the rate tend to vary outside a predetermined range, a different combination of stages is switched in. The stages supply currents which are binary weighted.

22 Claims, 7 Drawing Figures

HIGH-POWER, HIGH-FREQUENCY INVERTER SYSTEM WITH COMBINED DIGITAL AND ANALOG CONTROL

This invention relates to power supplies, and more particularly to inverter systems for use therein.

Power supplies are used in almost all electronic equipment where power for operating the circuits is derived from a power line typically providing 115 VAC or 230 VAC at 50 Hz or 60 Hz. A power supply converts the line power into the particular form required by the electronic equipment; for example, 5 VDC is used in computer circuits, while 75,000 V is required to operate X-ray tubes.

Developments in power supply technology are being directed towards a reduction in size and weight, and an increase in efficiency. These goals may be achieved with the application of well-known inverter and switching techniques, utilizing frequencies much higher than the power line frequency. This is possible with the availability of new components that operate efficiently at high frequencies.

In most electronic applications, control and regulation of the output voltage or current are usually required, so that operation of the electronic equipment is unaffected by changes in line voltage or output loading conditions. Regulation in switching power supplies is generally achieved by adjusting the ratio of the "on" to "off" time of an electronic switch (such as a transistor or SCR). In early designs, it was common to keep the duration of the "on" time fixed, and to control the output by varying the frequency. Since the output power in this type of supply is a function of the ratio of "on" to "off" times of the power switch, maximum output is developed at the highest operating frequency when there are very short "off" times. Lower outputs are generated by reducing the frequency until, at zero frequency, no output is obtained. While this method of control can work satisfactorily, the technique suffers from many disadvantages. These occur at low and intermediate power levels where generation of audio noise from the magnetic components, poor response time in the regulating circuits, and high percentage ripple at low output voltages can become intolerable. Because of these undesirable characteristics, most switching power supplies now operate at a fixed frequency, typically between 20 kHz and 50 kHz, and control of the output is achieved by varying the duration of the "on" pulse, a technique known as pulse width modulation. Operating at a fixed frequency keeps the ripple frequency constant, and prevents noise pollution.

However, the development of new components (e.g., SCRs, transistors, inductors and capacitors) that allow very high currents to be switched at high frequencies has opened up new possibilities of high frequency power conversion at much higher power levels than is practical with conventional pulse width modulation using transistors. At these high power levels (in the multikilowatt range), it becomes more important to switch power devices on and off at low instantaneous values of current so that stresses in the switching components are reduced and radio frequency interference (RFI) is minimized. Since these conditions are conveniently realized with sinusoidal current waveforms, series resonant inverter systems operating at high frequencies (e.g., greater than 20 kHz) are now being developed for high power applications.

The problem with this type of circuit is that regulation is obtained by control of the repetition frequency of the inverter rather than by pulse width modulation. At the lower frequencies, at lower power levels, the audio noise generated by the magnetic circuits can be intolerable. The magnitude of the ripple can also become excessive at the lower frequencies. Furthermore, the design of a power transformer which can operate over a wide frequency range is difficult, particularly when high step-up or step-down ratios are needed for the generation of high or low voltages; resonances of the primary and leakage inductances with the interwinding and circuit capacitances can cause instabilities and non-linearities in the control circuits.

It is an object of my invention to provide a series inverter which operates over a wide power range but over a narrow (above audible) frequency range, and a series inverter which is especially adapted for use with SCRs designed to carry large currents up to thousands of amperes.

Changing the value of input DC voltage to the inverter varies the output power, but this control method cannot normally be used because the available output voltage in this type of circuit is restricted to a value less than the value of input voltage, thus reducing the range of control. Power variations are better achieved by adjusting the inverter repetition frequency. But if the frequency is to remain high enough to meet the ripple, response time and audio requirements, a wide range of control may not be achieved simply by varying the frequency.

My invention is predicated on the fact that the power output of a series inverter is proportional to the square root of the ratio C/L, where C is the magnitude of the resonating capacitance and L is the magnitude of the resonating inductor. If the output power requirements are halved, for example, the value of C could be reduced by a factor of four, or the value of L increased by a factor of four. Alternatively, the value of C could be halved while simultaneously doubling the value of L. The required change in output power would then be provided without a change in operating frequency, thus maintaining high ripple frequency, fast response to line and load variations, and acoustic noise above the audible range.

In accordance with the principles of my invention, a combination of digital and analog techniques is used. Multiple stages of resonating capacitances and inductances provide coarse control of power, while fine control is obtained by adjustment of frequency over a relatively narrow range (generally less than two to one). Separate resonant circuits are electronically switched in as required by the output load, and can be connected together at the output of the inverter because series resonant circuits provide current sources that allow them to be directly added. It is desirable to keep the product of resonating capacitance and inductance constant so that the resonant frequency of each circuit is the same. This simplifies the timing considerations and synchronizes the instant when current reverses in each resonant circuit. For example, if one circuit comprises a single inductor and capacitor, and the second circuit uses two equal-value inductors and two equal-value capacitors in parallel, then the product of inductance and capacitance of the two circuits remains constant; thus the resonant frequency will be the same although the current in the second resonant circuit will be twice that in the first.

Various combinations of current sources, such as those produced by resonant circuits, can be configured so that wide ranges of power can be developed while maintaining the operating frequencies of the inverter at values above the audio range. In a typical application, four resonant circuits are used, arranged so that, as the output power requirements are increased, the number of circuits supplying power increases from one at low power, to four at full power. Many configurations are possible; in one of these, the lowest power stage provides one-eighth of the maximum power when operating at maximum frequency, then an additional stage of equal power is applied as the load increases beyond one-eighth, while the frequency is made to drop by a factor of two. At one-quarter power, when the operating frequency has again increased to the maximum, a third stage is added having twice the current capability of each of the first stages, and the frequency is again halved. Further power is then developed by increasing the frequency to the maximum value, at which point the remaining resonant circuit, having four times the current capability of the first stage, is switched in. This power combination, 1-1-2-4, is one of the practical arrangements. An alternative system could use a binary weighted power arrangement where the combination is 1-2-4-8. The power change in this case, and hence the frequency change, between the first two stages is 100%, and decreases to 7% at the last change. Another combination, where the maximum power change per stage is always less than 65% (rather than 100% as in the previous case), is 1-1.6-4.2-11 using binary sequencing. Other values of power levels and sequencing can be used, but by way of illustrating an application of the invention a simple binary power system will be described.

In this system, a number of series resonant circuits (used as current sources), having the same resonant frequency but operating at different current levels, supply power to the load in controlled combinations in such a way as to always keep the frequency at a high value. Control of the proper combination of resonant circuits is determined by instantaneous measurement of the output power and by feedback from the output voltage or current sensing circuits. Precise control of the output is maintained by a fine adjustment in operating frequency, over a relatively narrow range. When the frequency tries to exceed the desired range to provide the required output, the appropriate resonant circuit or circuits are added or removed to restore the operating frequency within the defined range.

Further objects, features and advantages of my invention will become apparent upon consideration of the following detailed description in conjunction with the drawing, in which:

FIG. 4 depicts what happens in the event of a shoot-through;

Figure 1:
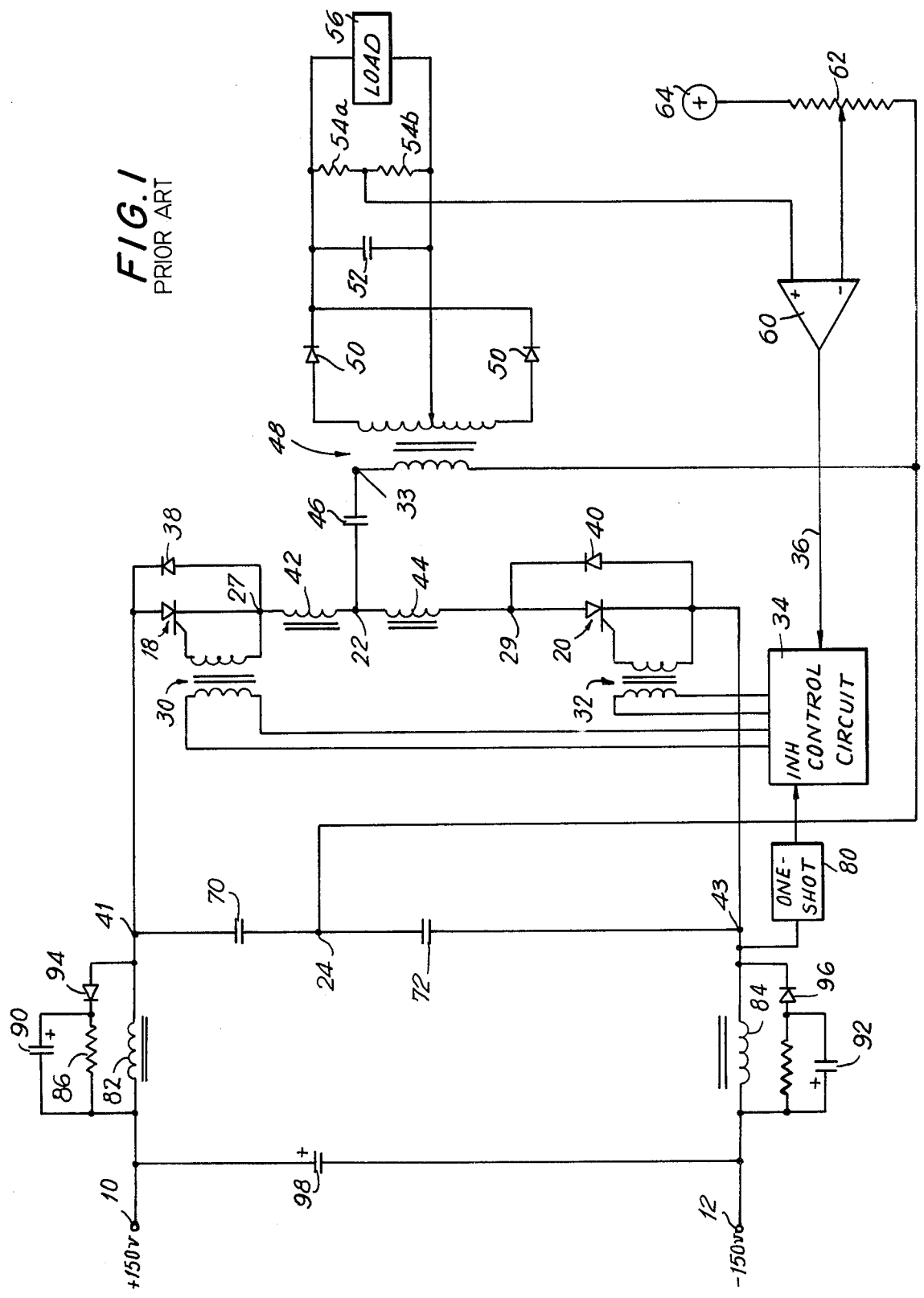
FIG. 1 depicts a prior art type single-stage inverter (with additional shoot-through protection to be described)

In the system of FIG. 1, which shows a single stage inverter, the DC input is applied across terminals 10,12. The magnitude of the input is typically 300 volts, with terminal 10 being at a +150 volt potential and terminal 12 being at a potential of −150 volts. Capacitor 98 is typically very large in magnitude, e.g. 5,000 microfarads. An electrolytic capacitor is employed, to minimize the volume of the overall system. Capacitor 98 can be thought of as part of the DC input power source. It serves to smooth the input in the event it is derived from an AC line, and it is not essential to the inverter operation.

The inverter includes two series circuits, each having an SCR 18 or 20, and an inductor or choke 42 or 44. Typically, each inductor has a magnitude of 10 microhenries. Control circuit 34 alternately triggers the two SCRS through pulse transformers 30,32, each pulse transformer being connected between the gate and cathode of a respective SCR. The frequency at which the SCRS are fired determines the output voltage, as will become apparent below. The resonant output circuit includes a capacitor 46 and a load. The actual circuitry depicted for the load in FIG. 1 is one which is often found in practice. The inverter functions to transform the DC input potential to an AC potential across a load. In a typical application, however, what is desired is a DC potential. Thus what is shown in FIG. 1 is a standard rectifier which includes a transformer 48, a pair of diodes 50 and a filter capacitor 52, together with a "real" load 56.

In order to control the amplitude of the DC output potential, a feedback circuit is employed. Resistors 54a, 54b feed a fraction of the output voltage to the plus input of difference amplifier 60. A reference potential 64 is extended through a variable potentiometer 62 to the minus input of the difference amplifier. The amplifier output is thus an indication of the difference between the actual DC potential derived and that which is desired. The output of the amplifier is extended to the input of control circuit 34. The control circuit is simply a voltage-to-frequency converter which alternately pulses transformers 30, 32 at a repetition frequency determined by the potential on control line 36. The voltage-to-frequency converter of control circuit 34 provides a polarity reversal so that an increase in voltage on the control line 36 causes a corresponding reduction in frequency. This standard type of feedback circuit causes the SCRs to be fired more frequently when the DC output potential must be increased, and less frequently when the DC output potential must be decreased. Control and feedback circuits for inverter systems are well known in the art, and any of many standard circuits may be employed.

The system operation can be best understood by assuming that resonating capacitor 46 is initially discharged, that no current flows in the circuit, and that the load (between capacitor 46 and the junction of capacitors 70,72) is replaced by a short circuit. In such a case, nodes 22 and 24 are both at a common potential. When SCR 18 is fired, a 150-volt potential appears across inductor 42, capacitor 46 and the load. Typically, capacitors 70, 72 may be twenty times as large in magnitude as capacitor 46 (e.g., capacitor 46 may be only 1 microfarad), so the effect of capacitors 70,72 on the resulting resonance is small. (This is equivalent to treating the effective DC input potential between terminal 10 and node 24 as constituting a zero-impedance power supply). Current starts to flow down through inductor 42, to the right through capacitor 46, and down through the load. Even if the load has zero impedance, as assumed, the peak current is limited by the resonant circuit comprising inductor 42 and capacitor 46, the peak current being proportional to the product of the DC input voltage and the square root of the ratio of the magnitudes of capacitor 46 and inductor 42, as is known in the art. Because the inductor and the capacitor comprise a resonant circuit, the current reverses direction after one-half cycle. As soon as the current reverses direction, SCR 18 turns off. The current which now flows upward through inductor 42 flows through commutating diode 38. In the case of a zero-impedance load, the negative current peak has the same magnitude as the positive current peak. At the end of the second half-cycle, diode 38 ceases to conduct. Current flow ceases altogether because positive current (down through inductor 42) can flow only when SCR 18 is on, and it is not fired again. One of the main advantages of the use of a resonant circuit in this manner is that current flow always ceases at the end of a cycle of the oscillatory waveform when the current is zero. Were the current to otherwise cease abruptly, large transient voltages would be induced and the resulting radiation might interfere with connected electronic equipment.

With a zero-impedance load, the potential at node 22 after the first half-cycle is 300 volts, and the potential at the end of the overall cycle is once again zero. In a practical situation, of course, the load does have impedance. Also, at the end of a cycle when the current has returned to zero, the voltage across capacitor 46 will not be zero, and the capacitor remains charged. Were SCR 18 the only switching device employed, each firing of it would increase the charge on capacitor 46, and after several cycles of operation the capacitor would be charged to the point at which no more power could be delivered through it to the load. In order to restore the charge across capacitor 46, SCR 20 is employed. Each time that this device is fired, it causes a current to flow in the reverse direction through the capacitor, thus giving rise to an AC potential across the output transformer. Assuming a short-circuited load, however, the current through capacitor 46 and the voltage at node 22 are both zero at the end of a single cycle of resonance through the series circuit which includes SCR 20.

Figure 2:
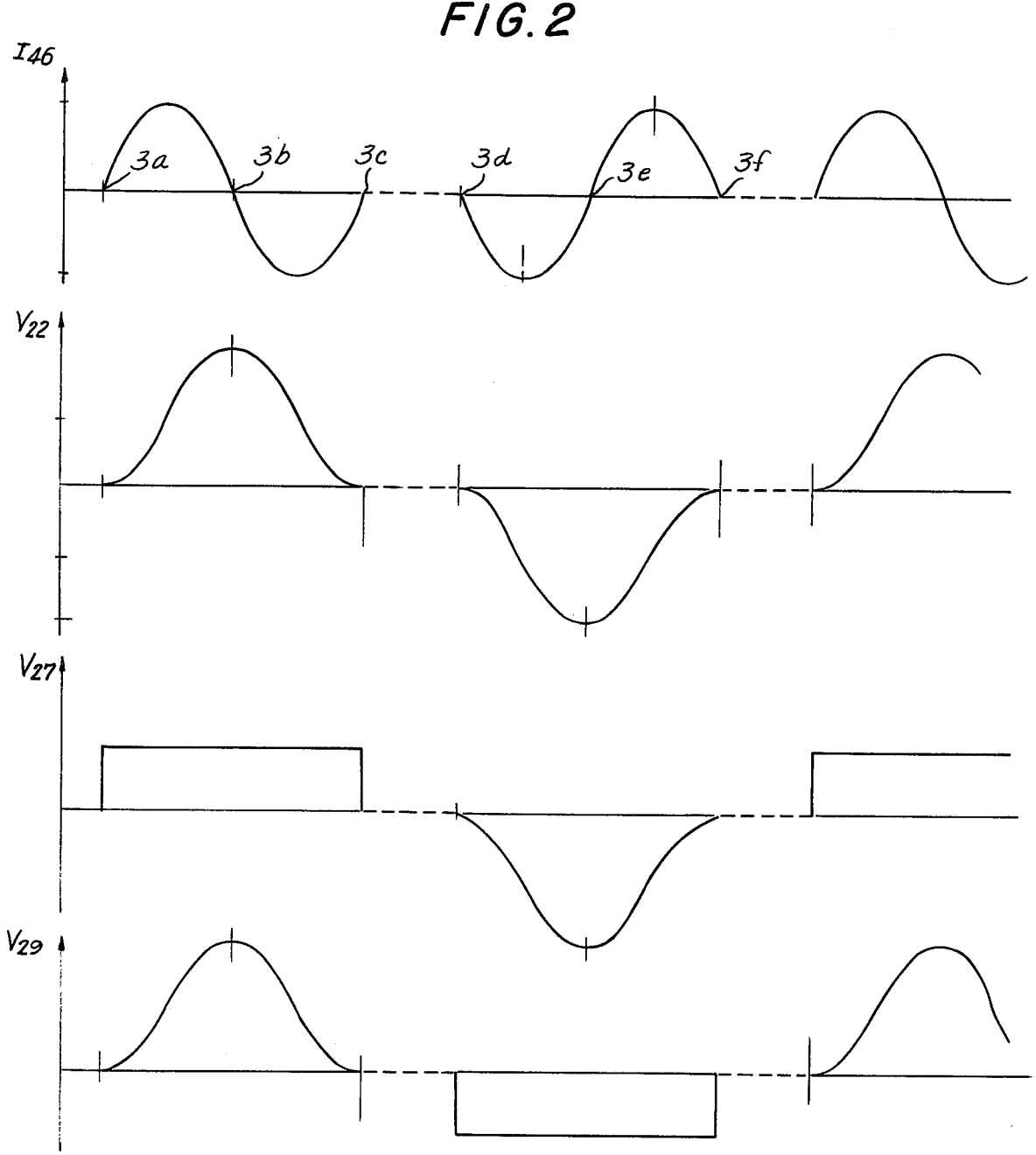
FIG. 2 depicts idealized current and voltage waveforms, for a zero-impedance load, which will be helpful in understanding the operation of the inverter of FIG. 1.

FIG. 2 depicts several current and voltage waveforms for the case of a short-circuited load. The first waveform represents the current through capacitor 46, with positive current being in the left-to-right direction and with the peak currents typically being about 50 amperes and −50 amperes respectively. At time 3a, SCR 18 is fired and a resonating current starts to flow through the SCR, inductor 42 and capacitor 46. The current reaches a peak of 50 amperes when the supply potential of 150 volts appears at node 22 (the second waveform on FIG. 2). The current then starts to decrease and goes to zero at time 3b, with the potential at node 22 rising to 300 volts and the SCR turning off. During the second half-cycle diode 38 conducts, a negative current flows, and the voltage at node 22 returns to zero. At time 3c, current stops flowing and the voltage at node 22 remains at zero.

Some time later, at time 3d, SCR 20 is triggered. Now current first flows from right to left through the capacitor. At time 3e, SCR 20 turns off and the voltage at node 22 is at −300 volts. Diode 40 conducts during the second half-cycle, all current flow ceasing at time 3f.

The third waveform on FIG. 2 depicts the voltage at node 27. For as long as current flows through inductor 42, SCR 18 or diode 30 conducts and node 27 is held at the 150-volt potential at terminal 10. When both SCR 18 and diode 38 are off, the potential at node 27 simply tracks that at node 22. Similar remarks apply to the fourth waveform of FIG. 2 which depicts the voltage at node 29.

Figure 3:
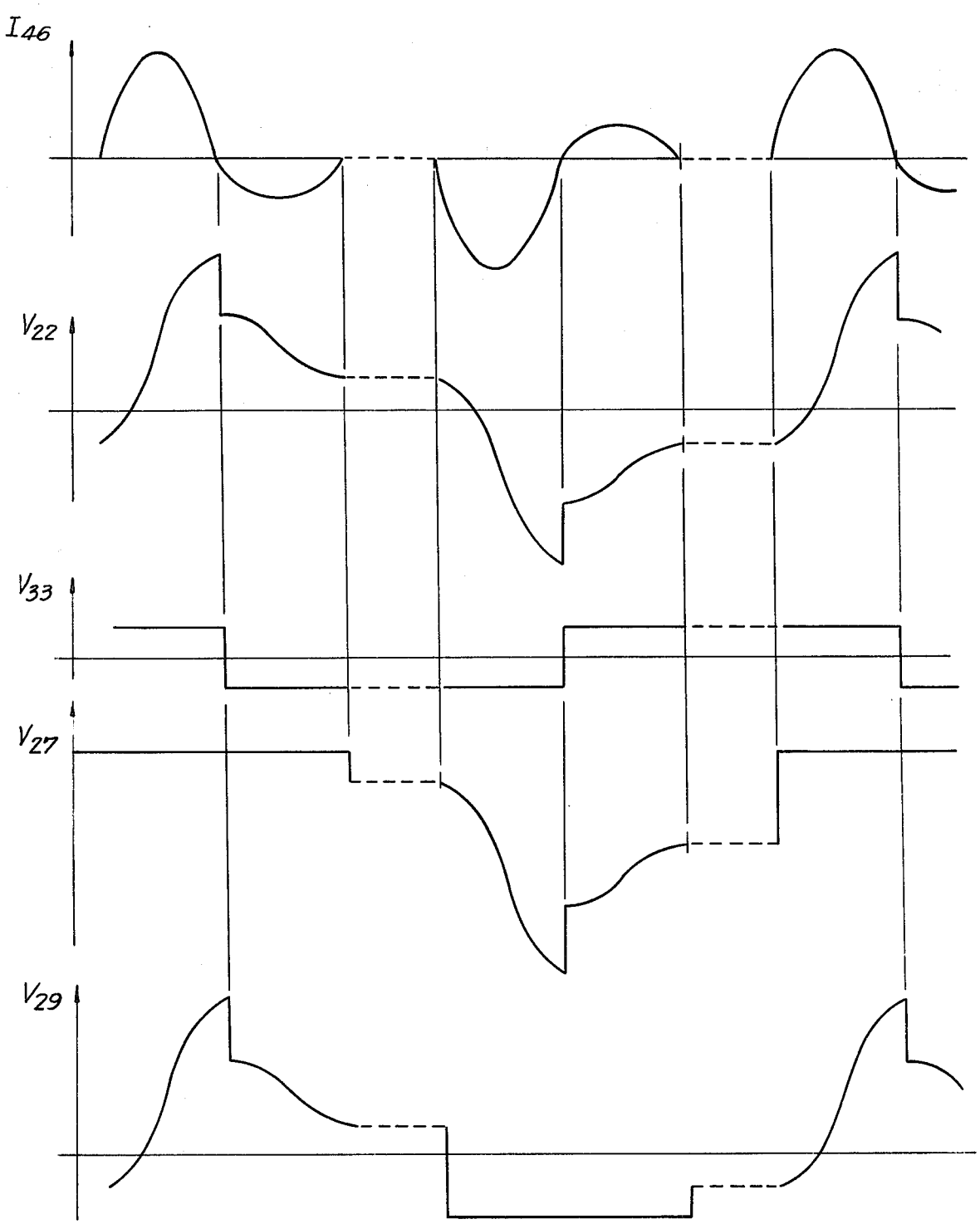
FIG. 3 depicts comparable waveforms for a non-zero load.

The analysis above for the case of a zero-impedance load always applies insofar as the cessation of current flow is concerned at the end of each cycle of operation, but it is not true in the case of a real load that the potential across capacitor 46 is zero at the end of each cycle. There are therefore abrupt steps in voltage at node 22 (and therefore at nodes 27 and 29), and the capacitor current is lower in magnitude when the commutating diodes conduct than when the SCRs conduct. However, while the polarity of the charge on the capacitor is reversed between alternate cycles, a degree of symmetry is maintained in that at the beginning of each cycle the magnitude of the starting voltage across the capacitor is always the same, and the net DC current through the capacitor is zero. FIG. 3 depicts four waveforms comparable to those of FIG. 2 for a non-zero load, one which results in a voltage waveform at node 33 (across the primary winding of transformer 48) which alternates between +100 and −100 volts. The waveform at node 33 is also shown in FIG. 3.

As mentioned above, one of the main advantages of the prior art type circuit of FIG. 1 is that whenever an SCR is fired, the resulting current constitutes only a single cycle of an oscillatory waveform, the current flowing through the SCR during the first half-cycle and through the respective commutating diode during the second half-cycle. The SCR turns off automatically when the current drops below the "holding" value, the diode turns off at the end of the cycle when the current attempts to reverse direction once again, and there is no second cycle of conduction because the SCR remains off. The rate at which the SCRs are fired determines the total power delivered to the load, and thus a simple voltage-to-frequency control circuit can be employed to vary the output potential across the load.

The system of FIG. 1 is provided with protection against simultaneous conduction of the SCRs, a condition known as shoot-through and which might otherwise damage the SCRs and result in shut down of the power supply.

Capacitors 70,72 behave as resonating capacitors when a shoot-through occurs; they can therefore not be electrolytic components because the potential across them reverses in polarity. In the event of external interference, or a load transient condition which is more common in high voltage applications where arcing may occur in the output load circuit, it is possible for SCRs 18 and 20 to fire simultaneously or to overlap in conduction. When this happens, the two SCRs establish resonant circuits which comprise capacitors 70,72 and inductors 42,44. The resonant circuits are isolated from the DC source by chokes 82,84. Capacitors 70,72 each has a magnitude of only about 20 microfarads, so the current build-up is relatively fast and resonates due to the isolation provided by inductors 82, 84.

Typically, capacitor 46 has a magnitude of one microfarad. The peak current which is reached when inductor 42 (or inductor 44) resonates with capacitor 46 is proportional to the square root of the ratio of the capacitance of capacitor 46 to the inductance of inductor 42. Similarly, the peak current which is achieved when capacitors 70,72 resonate with inductors 42,44 is proportional to the square root of the ratio of the magnitude of one of the capacitors to the magnitude of one of the inductors. Consequently, with each of capacitors 70,72 having a capacitance which is approximately 20 times greater than that of capacitor 46, the peak current which is reached following a shoot-through is equal to about 4.5 (the square root of 20) times the peak current which is reached during normal operation, that is, the peak repetitive current which flows during normal inverter cycling. A typical SCR can absorb a single pulse whose peak is about ten times its normal maximum repetitive current; consequently, the single large pulse which flows through the two SCRs during the first half-cycle of the resonating current which follows a shoot-through can be absorbed without damaging the SCRs—provided that the pulses occur at a low enough repetition rate (e.g., 10 Hz).

As current flows through the resonant circuit comprising capacitors 70,72 and inductors 42,44, the current passes through zero and both SCRs turn off. At this time, the voltages across capacitors 70,72 have reversed, node 41 being at −150 volts and node 43 being at +150 volts. Until the SCRs turn off, diodes 38 and 40 are short-circuited and no currents flow through them. But as soon as the SCRs turn off, current reverses in the resonant circuit, diodes 38 and 40 now conducting reverse currents. The voltage at node 41 now starts to rise from −150 volts. Even after the potential passes through zero, diode 38 continues to conduct current which is being forced to flow by inductor 42. Were the potential at node 41 allowed to continue to rise until the end of the negative half-cycle, the potential could rise well above +150 volts, depending upon when the shoot-through occurs and the values of inductors 82, 84 (which acquire energy during the shoot-through when large voltages exist across the inductors). At the end of the negative half-cycle of resonance, current would cease to flow through diode 38, but the diode might now be reverse biased by a potential much higher than the nominal potential between terminal 10 and common node 22. The large positive potential at node 41 might stress SCR 18 and diode 38 if normal triggering continued throughout the shoot-through period. On the other hand, if SCR 18 and diode 38 are both off, capacitor 70 resonates with inductor 82. Inductor 82 must be large in magnitude (e.g., 200 microhenries), that is, many times larger in magnitude than inductor 42, in order to isolate the DC input power source from capacitors 70, 72 so that a resonating phenomenon can take place following a shoot-through to control turn-off of the SCRs. The resonance which would now occur would be of low frequency and could interfere with the immediate resumption of normal inverter operation.

It is for these reasons that the clamping circuits are provided. As the potential at node 41 rises to a level slightly about +150 volts, diode 94 conducts. It is at this time during the reverse half-cycle that current flows through diode 94 to charge capacitor 90 and to limit the voltage developed across inductor 82. By the time diode 94 turns off, there is still some energy stored in the inductor, and it is only now that capacitor 70 starts to resonate with inductor 82. While the resonance would ordinarily persist for quite some time due to the high inductance of inductor 82, there is relatively little energy remaining to be dissipated. Consequently, control circuit 34 can immediately begin to control a resumption of normal operation. Similar remarks apply to the clamping circuit associated with inductor 84 and the negative potential which would otherwise develop at node 43.

Figure 4:
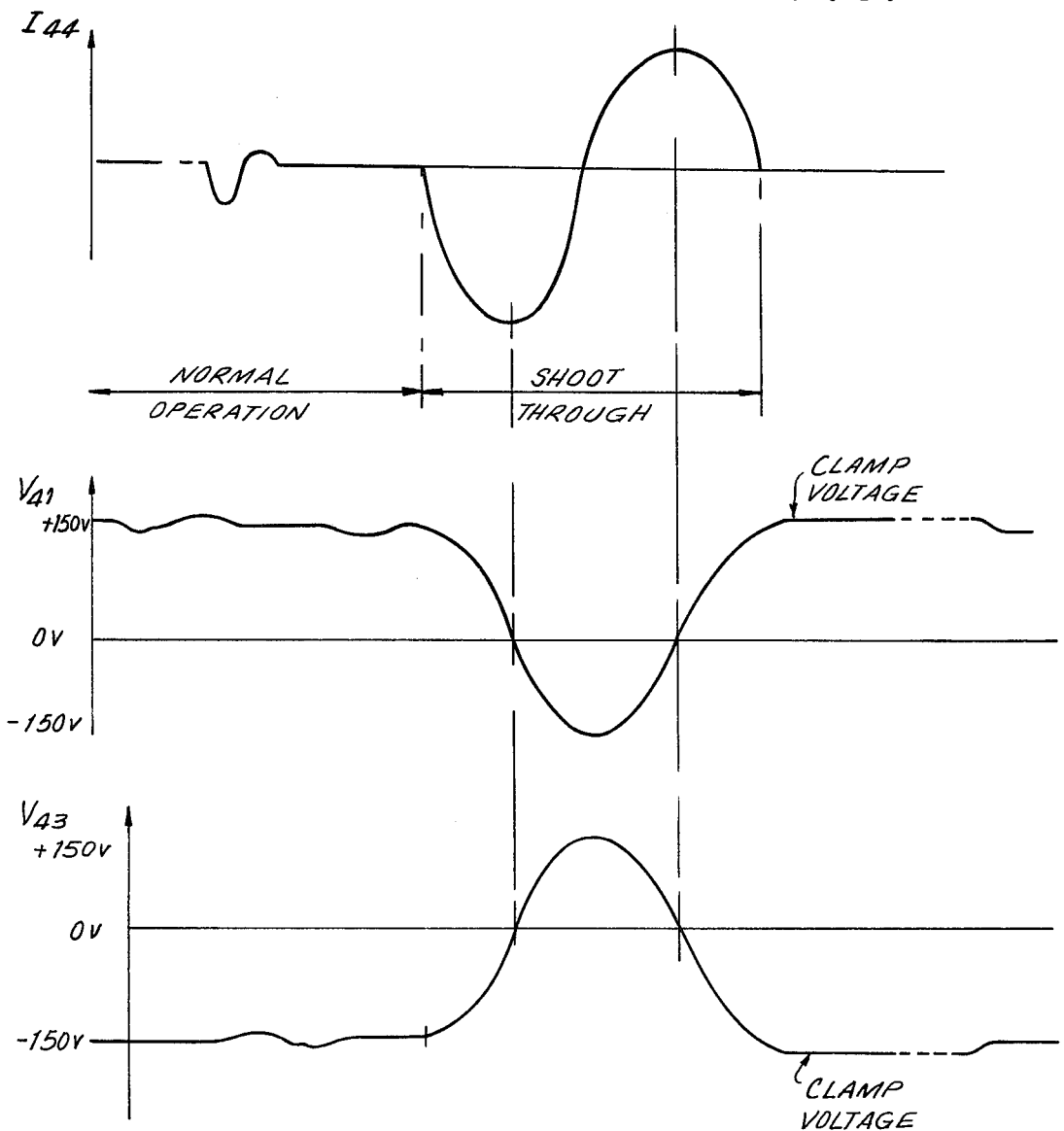

FIG. 4 depicts three waveforms which illustrate the operation when a shoot-through occurs. The first waveform depicts the current through inductor 44. At the left of the waveform is the current which flows during normal operation, this current being the same as the middle current cycle at the top of FIG. 3 (since the same current flows through capacitor 46 and inductor 44). The waveforms of FIG. 4 are drawn to a much lower scale than those of FIG. 3. It is to be noted that when a shoot-through takes places, large currents flow through inductor 44, the peaks reaching above +200 and below −200 amperes.

The two lower waveforms in FIG. 4 depict the voltages at nodes 41 and 43. The nominal voltages are +150 and −150 volts respectively, with the voltages changing slightly whenever one of inductors 42 or 44 resonates with capacitor 46 during normal operation. But when a shoot-through occurs, the voltages at nodes 41 and 43 change dramatically as capacitors 70 and 72 resonate with the inductors. Both voltages swing by about 300 volts. At the end of the single-cycle of resonance, the two nodes are clamped and the excessive voltages which would otherwise occur are prevented.

When a shoot-through is present, node 43 rises in potential well above the potential at node 24. At this time one-shot multivibrator 80 is triggered. The output of the multivibrator is applied to an inhibit input of control circuit 34, the control circuit thus being disabled and no longer applying trigering pulses to the SCRs. The period ot the multivibrator should be selected in accordance with the particular application. For example, if it is known that when arcing occurs it will be continuous for quite some time, the control circuit should be inhibited for at least this duration. However, in many applications the control circuit needs to be inhibited for a period of perhaps only 200 microseconds to 20 milliseconds. Recovery from the shoot-through fault allows normal inverter operation to resume almost immediately without requiring any manual invervention such as operating a circuit breaker.

The problem with the prior art circuit of FIG. 1 is the wide range of frequencies required to cover output voltage and current variations from zero to full specified values. The circuit of FIG. 5 (in which components comparable to those in FIG. 1 have the same numeral designations) overcomes this problem by switching in combinations of inverters so that the operating frequency remains high (above the audio range) at all power levels. In addition to providing this advantage, the circuit allows much higher maximum output power to be obtained than is possible with just one inverter.

Input power from a nominal 220 V AC source at terminals 11 is rectified by bridge 13 to develop a 300-volt potential across capacitor 98. Separate high-frequency filter capacitors 70-1 through 72-4 (comparable to capacitors 70 and 72 in FIG. 1) are connected through respective isolation diodes 15-1 through 17-4 so that in the event of a shoot-through in any inverter stage ST-1 through ST-4, the voltages at node 41 and 43 are allowed to reverse without affecting the voltages applied to the remaining inverter stages. The high-frequency capacitors are provided so that those on the stages not experiencing a shoot-through remain charged to power their respective stages; this is desireable since the drive to all inverter stages is removed while the shoot-through resonant circuit recovers.

Figure 5:
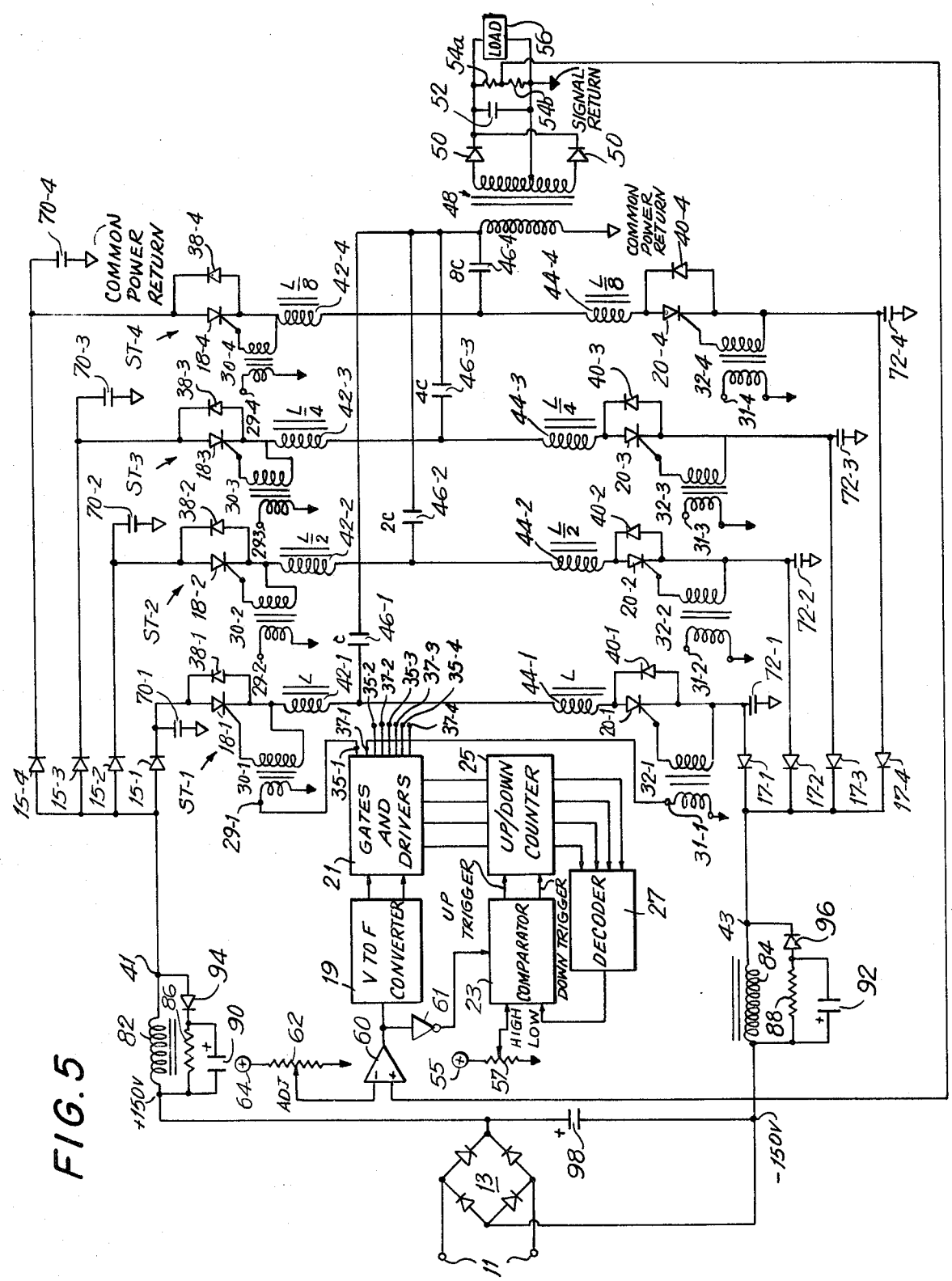
FIG. 5 depicts the illustrative embodiment of the invention.

The circuit of FIG. 5 is in many respects similar to that of FIG. 1. The main differences relate to the control section, and to the incorporation of four inverter stages ST-1 through ST-4 connected in parallel. Gates and drivers 21 trigger respective stages in a manner comparable to that in which the individual stage of FIG. 1 is triggered. (Terminals 35-2 through 37-4 are connected to respective terminals 29-2 through 31-4 in a manner equivalent to that shown for stage ST-1.) The circuit 21 simply extends pulses from the voltage-to-frequency converter 19 to a number of pulse transformers 30-1 through 32-4 in accordance with the count of counter 25. For example, if the count is binary 1010, only the pulse transformers associated with stages ST-2 and ST-4 will be pulsed.

The four resonant circuits are connected in parallel so that the inverter stage currents can be summed together. Because the resonant frequency of a stage is proportional to the product of its inductor (42- or 44-) and capacitor (46-), all stages operate at the same frequency; while the capacitors of successive stages are doubled in magnitude, the inductor magnitudes are halved. At the same time, however, successive stages provide doubled increments of power because the power delivered by any stage is proportional to the square root of its capacitance divided by its inductance. Inverter stage ST-1 provides a maximum of 1/15 of the total power capability of the complete inverter system. In reality, the useful output power available from this section is usually much less than 1/15 of the total since fixed circuit losses, particularly when a step-up transformer ratio is used, can absorb a significant part of the power available from this least significant power stage. The result is a high frequency of operation, even at low output voltages and current levels. In addition, a preload of typically 3% to 5% is often used to provide discharge in the output circuit and a fast response under light load conditions. The least significant stage therefore provides power for the losses in the system, leaving only a very small percentage (typically less than 2% of the maximum output power) for useful output power, even when running at maximum frequency (e.g., 40 KHz). The frequency at which this stage operates is above the audio range at all useable power levels. At extremely low levels (e.g., less than 1% of output power), the inverter frequency could fall into the audio range, but at these power levels the noise from the magnetic components is insignificant, and ripple requirements are less critical.

At all other power levels, operation remains above audio (20 KHz), as will now be described.

The basic control circuit comprises a voltage-to-frequency converter 19 which drives the gate electrodes of the SCRs in the four inverter stages ST-1 through ST-4 via logic gates and driver circuits 21. These logic circuits determine which SCRs receive the gate drive pulses generated from the outputs of the voltage-to-frequency converter 19. Control for the logic gates is derived from the input signal to the voltage-to-frequency converter which is an inverse voltage representation of the frequency, and hence the power, of the inverter stages in use at any instant.

This input voltage is inverted by inverter 61. The inverted voltage is applied to voltage comparator 23 which determines a voltage "window" used for triggering up/down counter 25. As the frequency of the inverter approaches maximum due to increased power required at the load, the control voltage at the input of the comparator approaches the high limit trip level determined by voltage source 55 and potentiometer 57. When the trip point is reached, the inverter frequency has reached the maximum designed limit (e.g. 40 kHz), and a pulse is then sent to the up/down counter to step up the digital counter. The outputs from the up/down counter gate on the appropriate combination of SCRs in the inverter stages to produce additional power, in this case equal to that of the lowest power stage. As a result of this increase in inverter power, the output voltage (or current) tends to rise. This is sensed by the feedback signal which is compared with the reference potential by control amplifier 60, and results in a compensating change in voltage applied to the voltage-to-frequency converter and comparator 23. The frequency of the inverter is thereby reduced and the voltage applied to the comparator returns to within the normal operating window.

Similarly, when the output power requirements are reduced, the inverter frequency is lowered by the signal from amplifier 60, and the voltage at the input of comparator 23 approaches the low trip level. At the trip point, the comparator sends a down control pulse to the up/down counter, reducing the digital counter by unity. This gates the drive to the appropriate combination of inverters so that the available output power is reduced by an amount equal to that of the lowest power stage (least significant bit). The output voltage then tends to fall, and the feedback signal causes a control voltage to be applied to the voltage-to-frequency converter 19 so as to increase the frequency and bring the input voltage to the comparator back within the normal operating window.

With this logic arrangement, the low trip level of comparator 23 should change with the count in the up/down counter since the frequency change with each bit change varies from 2:1 for the lowest bit to 1.07:1 for the highest bit. This is achieved by decoder 27 which decodes the output of the up/down conter, and changes the low trip level of the comparator so that it tracks the count in the up/down counter.

Consider the case in which all four stages are delivering current to the load and the upper frequency limit is 40 kHz. As the load requirements decrease, the frequency decreases. Eventually the frequency decreases to a value such that the stage which delivers the lowest value current should be disabled from operating. If the stage is disabled at this time, the remaining three stages will have to operate at a faster rate in order to satisfy the load requirement. If this rate is 40 kHz or more, the system will be unstable and will flip back to its original condition in which all four stages are enabled.

Figure 6:
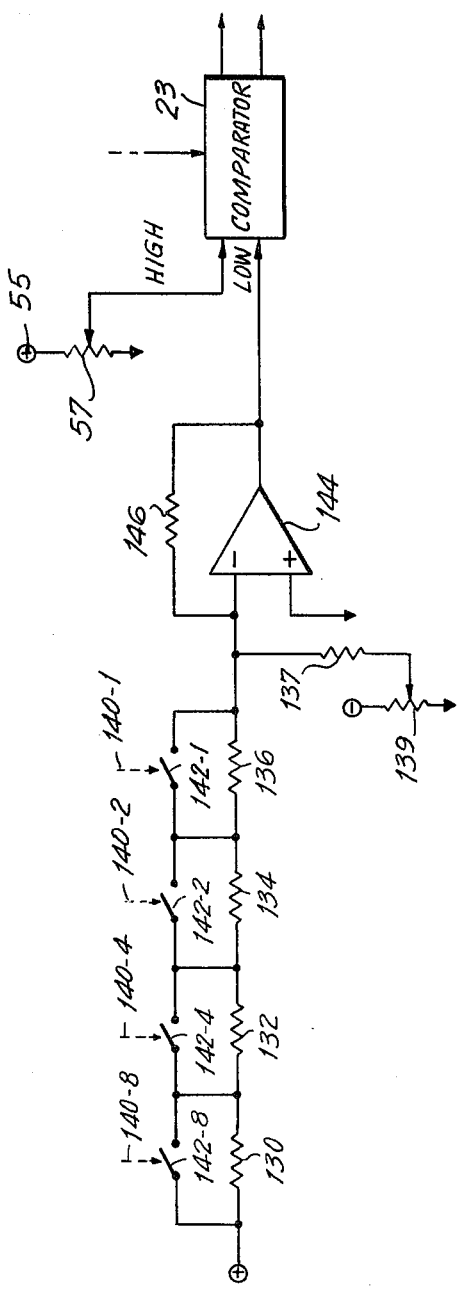
FIG. 6 depicts a preferred form of decoder 27 for use in the system of FIG. 5.

For this reason, the lower frequency limit which is used for any combination of enabled stages is a value which corresponds to a power level less than that which would otherwise be required to restore the frequency back to 40 kHz when the count of counter 25 is decremented. By doing this, when the least significant stage is switched out, the operating frequency will increase to a value less than the upper limit, e.g., 38 kHz. It should also be appreciated that as the total power is reduced, the lower frequency limit is reduced in larger and larger increments. The reason for this is that at the low power levels, the percentage effect of a single bit change on the overall power being delivered at the time is greater. This variation in control of the low frequency limit is the function of decoder 27 in FIG. 5. The decoder itself is shown in a preferred form in FIG. 6.

The four inputs to decoder 27 are derived from the up/down counter 25, and are shown by the dashed lines 140-1 through 140-8. Each of the counter outputs controls the operation of a gate 142-1 through 142-8, each gate being shown in symbolic form only. For example, when the second least significant bit of the counter is a 1, and stage ST-2 in FIG. 5 is enabled to deliver current, switch 142-2 is open. The switch is closed only when the corresponding stage is not enabled. Each switch bypasses a respective one of resistors 130, 132, 134, 136, with the resistors decreasing in magnitude from left to right. Resistor 137 is a bias resistor which determines the minimum low frequency limit in combination with adjustment potentiometer 139. The resistor chain is connected to the minus input of operational amplifier 144, which is provided with a feedback resistor 146 typically equal in value to that of resistor 136. The net effect of the arrangement is that the output of the operational amplifier 144, which is a voltage that determines the low frequency limit of comparator 23, varies in accordance with the particular group of stages ST-1 through ST-4 whose operations are enabled.

Figure 7:
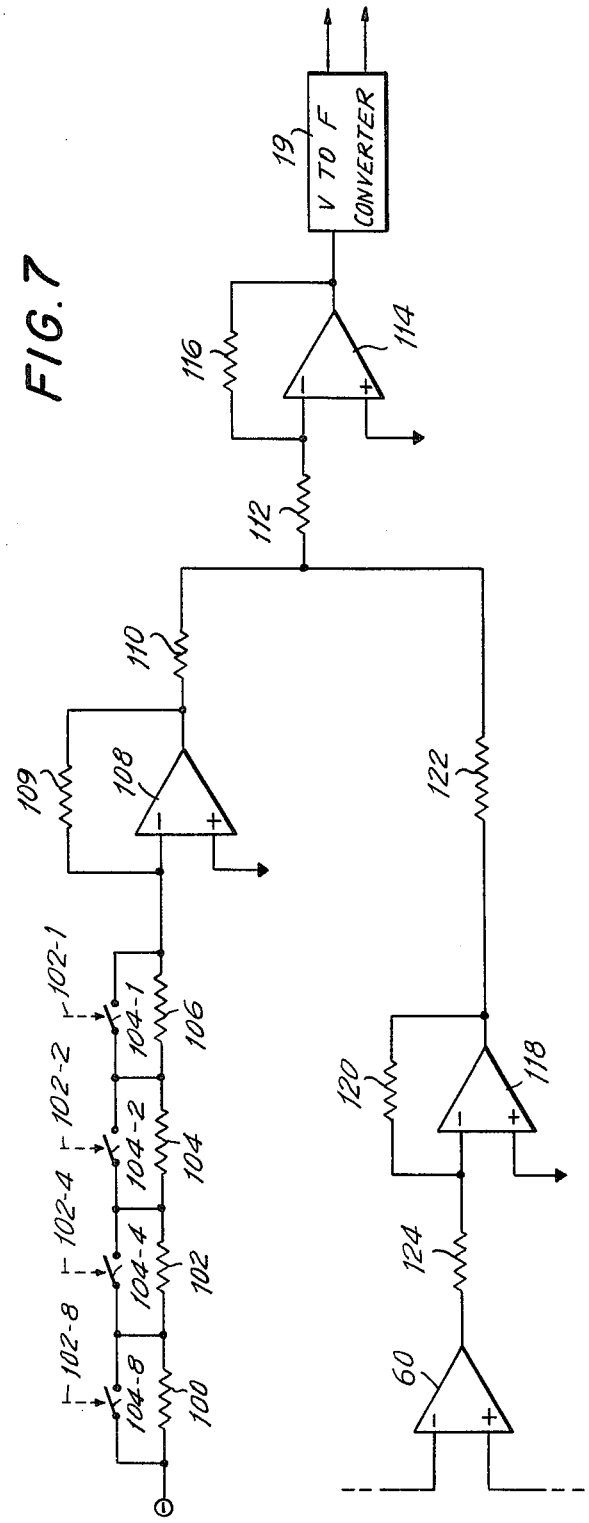
FIG. 7 depicts a feed-forward circuit whose use in the system of FIG. 5 is advantageous.

Improvements in smoothing the small step in the output voltage during a bit change can be made by decoding the outputs of the up/down counter and applying the decoded output voltage to the input of the voltage-to-frequency converter so as to provide a feed-forward signal while the main control loop takes control. Referring to FIG. 5, it will be noted that as the feedback signal from the load increases, the output of operational amplifier 60 increases. Because an increasing feedback signal represents a need to reduce the power level, voltage-to-frequency converter 19 operates so that its frequency of operation decreases as its input voltage increases. Referring to FIG. 7, a feed-forward signal circuit is provided which tends to speed up the change in the frequency of operation immediately following a change in the group of stages which are enabled. Operational amplifier 60 is shown on FIG. 7 together with voltage-to-frequency converter 19. Between the output of amplifier 60 and the input of converter 19, there are two inversion stages which comprise operational amplifiers 118 and 114, together with feedback resistors 120, 116 and isolating resistors 124, 122 and 112. The net effect of the feedback signal from operational amplifier 60 on the voltage-to-frequency converter 19 is thus the same in FIG. 7 as it is in FIG. 5. It is the additional circuitry on FIG. 7 which controls a rapid change in the frequency of operation following a change in the group of inverter stages whose operations are enabled.

The reason for providing the feed-forward circuit is that following a change in the group of stages whose operations are enabled, it takes some time until the feedback circuit causes a change in the operating frequency. During this transitional period, there may be exhibited a power variation at the output. In order to avoid this, a rapid change in the operating frequency is effected.

The change is effected by providing an additional operational amplifier 108 (with feedback resistor 109 and isolating resistor 110), together with a resistor chain and associated gates whose operations are controlled by the bit outputs of the up/down counter 25. The resistor chain connected to the minus input of operational amplifier 108 is comparable to the resistor chain shown in FIG. 6. Whenever there is a change in the group of inverter stages whose operations are enabled, there is a sudden change in the potential of the output of operational amplifier 108, and thus a rapid change in the frequency of operation. At the lower power levels, this change is larger than at higher power levels. The resistor magnitudes are selected such that the instantaneous frequency change in each case just cancels out any power level change which might otherwise occur due to the switching of the stages.

The type of logic, method of control and the number of SCR inverter stages are variables that depend upon the application of the power supply. However, these variables do not affect the basic principle of the invention which requires a multiple number of inverter power stages that are switched in as required by the load to keep the inverter frequency high under all loading conditions, and a fine adjustment of frequency to provide precise control of output power at all power levels.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. An inverter system having a DC input power source; a plurality of resonating current supplying stages connected in parallel to supply current to a load, all of said stages being resonant at the same frequency; first means responsive to the total load output varying from a predetermined value for adjusting the rate at which said stages operate in an attempt to maintain the total load output; at said predetermined value; and second means for determining when the rate of operation of said stages increases beyond a maximum limit or decreases below a minimum limit and in response thereto for enabling operations of a selected group of said stages in an attempt to maintain the rate of operation of said stages within such limits.

2. An inverter system in accordance with claim 1 wherein as the rate at which said stages operate decreases, said second means changes the group of stages whose operations are enabled to supply a smaller total current when said stages operate so that the rate at which said stages operate can increase while maintaining the total load output at said predetermined value.

3. An inverter system in accordance with claim 2 wherein said minimum limit of rate of operation is above the audible range.

4. An inverter system in accordance with claim 3 wherein the currents supplied by said stages are binary weighted.

5. An inverter system in accordance with claim 3 further including means for adjusting said minimum limit in accordance with the group of said stages whose operations are enabled.

6. An inverter system in accordance with claim 3 wherein each of said stages includes a capacitor and a pair of inductors, said stages supplying respective currents whose magnitudes are binary weighted, the capacitors in successive stages being doubled in magnitude and the inductors in successive stages being halved in magnitude.

7. An inverter system in accordance with claim 1 wherein said minimum limit of rate of operation is above the audible range.

8. An inverter system in accordance with claim 1 wherein the currents supplied by said stages are binary weighted.

9. An inverter system in accordance with claim 1 further including means for adjusting said minimum limit in accordance with the group of said stages whose operations are enabled.

10. An inverter system in accordance with claim 1 wherein each of said stages includes a capacitor and a pair of inductors, said stages supplying respective currents whose magnitudes are binary weighted, the capacitors in successive stages being doubled in magnitude and the inductors in successive stages being halved in magnitude.

11. An inverter system in accordance with claim 1 further including feed-forward signal circuit means for increasing the speed at which said rate of operation changes responsive to a change in the group of said stages whose operations are enabled.

12. A power supply having a DC input power source; a plurality of pulsed current supplying stages connected in parallel to supply an output to a load; first means responsive to the load output varying from a predetermined value for adjusting the rate at which said stages are pulsed in an attempt to maintain the load output at said predetermined value; and second means for determining when the rate at which said stages are pulsed increases beyond a maximum limit or decreases below a minimum limit and in response thereto for enabling operations of a selected group of said stages in an attempt to maintain the rate at which said stages are pulsed within such limits.

13. A power supply in accordance with claim 12 wherein as the rate at which said stages are pulsed decreases, said second means changes the group of stages whose operations are enabled to supply a smaller total current when said stages are pulsed so that the rate at which said stages are pulsed can increase while maintaining the total load output at said predetermined value.

14. A power supply in accordance with claim 13 wherein said minimum limit of the rate at which said stages are pulsed is above the audible range.

15. A power supply in accordance with claim 14 wherein the currents supplied by said stages are binary weighted.

16. A power supply in accordance with claim 14 further including means for adjusting said minimum limit in accordance with the group of said stages whose operations are enabled.

17. A power supply in accordance with claim 14 wherein each of said stages includes a resonating circuit having a capacitor and a pair of inductors, said stages supplying respective currents whose magnitudes are binary weighted, the capacitors in successive stages being doubled in magnitude and the inductors in successive stages being halved in magnitude.

18. A power supply in accordance with claim 12 wherein said minimum limit of the rate at which said stages are pulsed is above the audible range.

19. A power supply in accordance with claim 12 wherein the currents supplied by said stages are binary weighted.

20. A power supply in accordance with claim 12 further including means for adjusting said minimum limit in accordance with the group of said stages whose operations are enabled.

21. A power supply in accordance with claim 12 wherein each of said stages includes a resonating circuit having a capacitor and a pair of inductors, said stages supplying respective currents whose magnitudes are binary weighted, the capacitors in successive stages being doubled in magnitude and the inductors in successive stages being halved in magnitude.

22. A power supply in accordance with claim 12 further including feed-forward signal circuit means for increasing the speed at which a change occurs in the rate at which said stages are pulsed responsive to a change in the group of said stages whose operations are enabled.

* * * * *